Nov. 21, 1967
J. B. WRAY
3,353,300
GATE LATCHING MECHANISM
Filed May 27, 1965
2 Sheets-Sheet 1
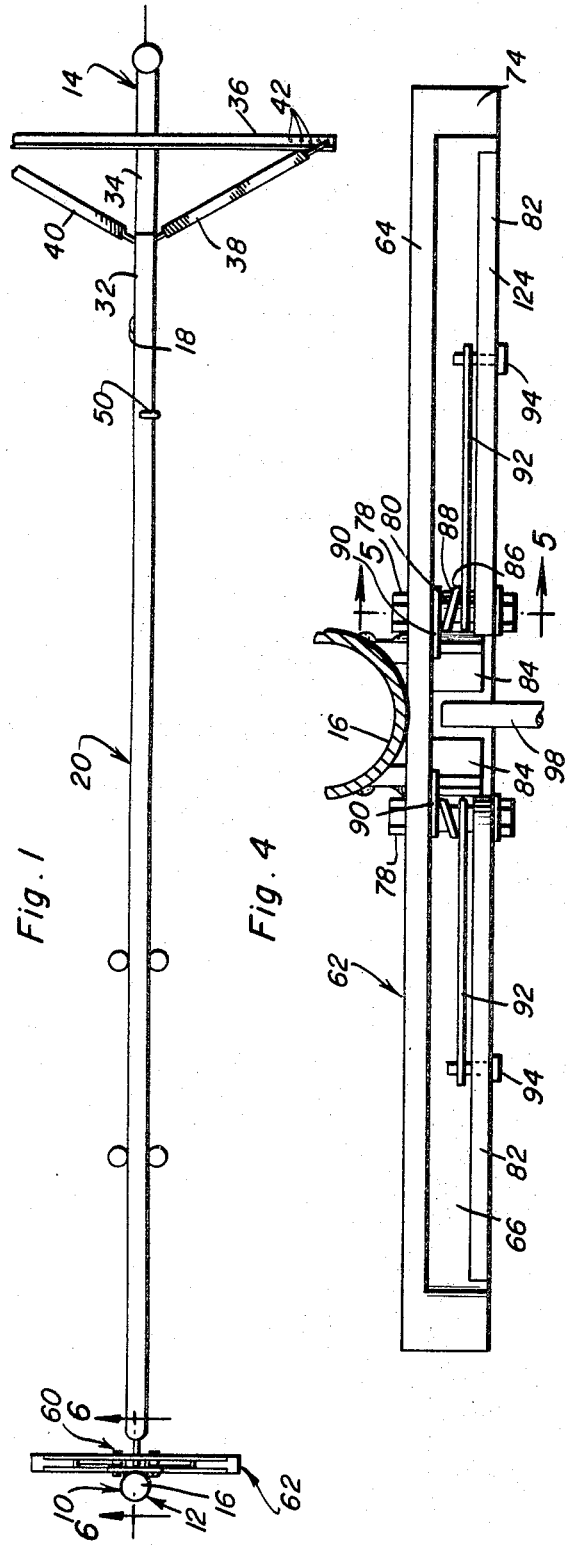
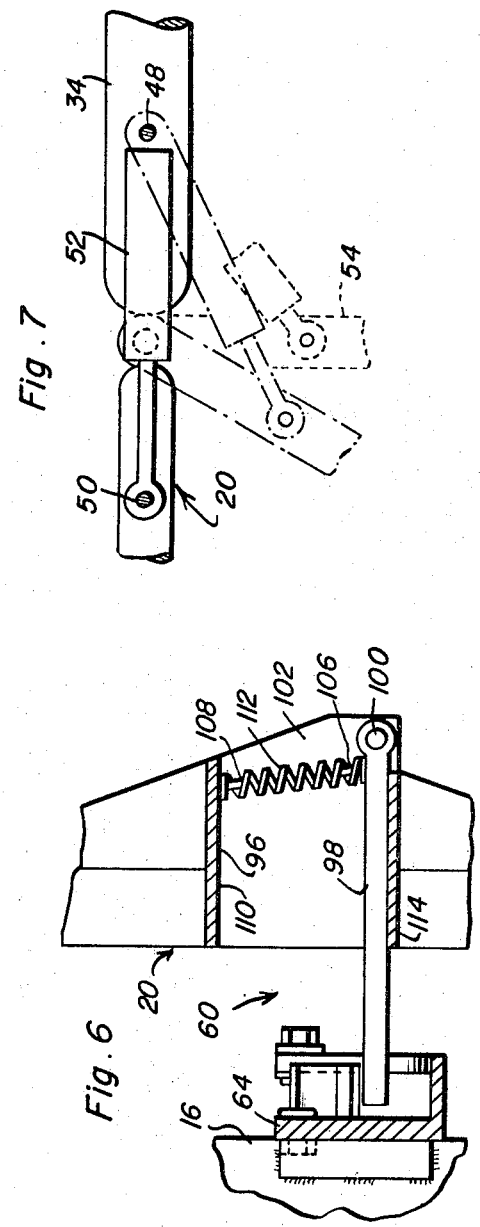
Jimmy B. Wray
INVENTOR.

Nov. 21, 1967  J. B. WRAY  3,353,300
GATE LATCHING MECHANISM
Filed May 27, 1965  2 Sheets-Sheet 2
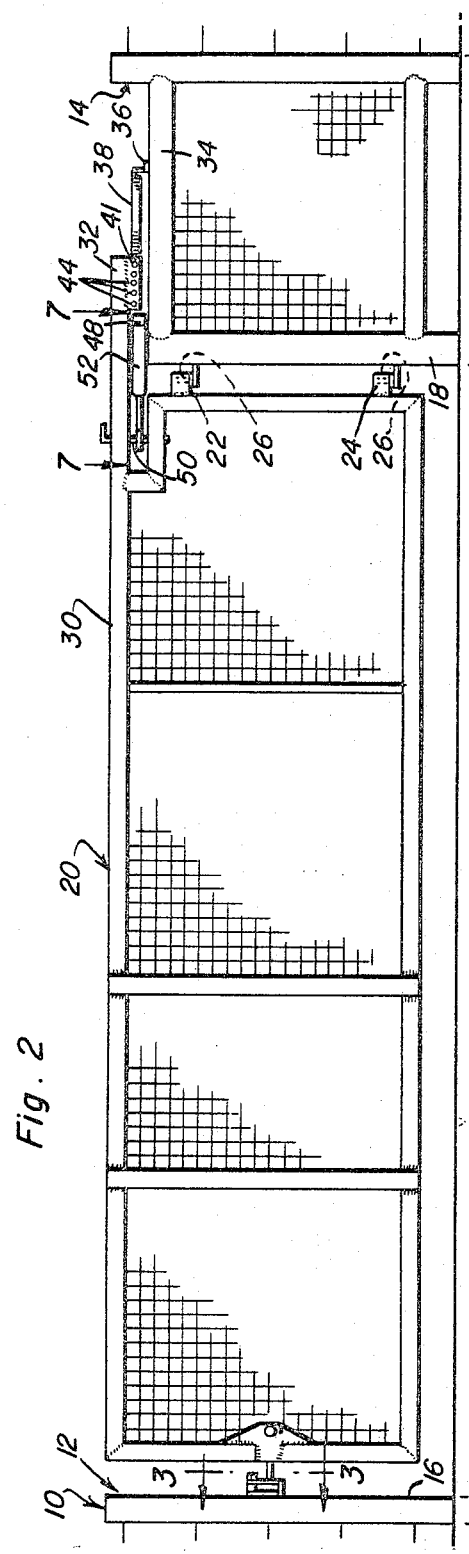
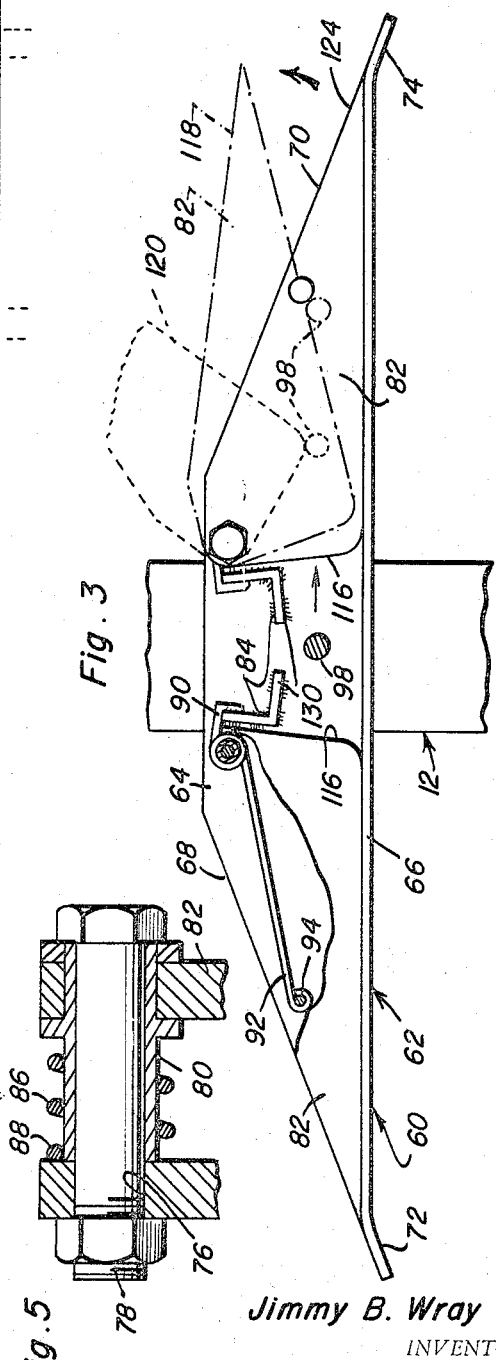
Jimmy B. Wray
INVENTOR.

United States Patent Office 3,353,300
Patented Nov. 21, 1967

3,353,300
GATE LATCHING MECHANISM
Jimmy B. Wray, Fort Belknap Road,
Graham, Tex. 76046
Filed May 27, 1965, Ser. No. 459,220
11 Claims. (Cl. 49—386)

This invention relates to a novel and useful gate latching mechanism and more specifically to a latching mechanism which is adapted to be utilized for releasably securing the free swinging edge portion of a horizontally swingable gate member in the closed position. In addition, the gate latching mechanism of the instant invention also includes means for yieldingly urging the gate member toward the closed position, means being also provided for controlling the rate of movement of the associated gate member toward the closed position.

There are many instances where it is desirable for a horizontally swingable gate member to have latching means operatively associated therewith capable of releasably retaining the free swinging edge portion of the gate member in a closed position when the gate member is utilized to close an opening in a fence through which a road extends. With this type of latching mechanism vehicles may engage the free swinging edge of the gate member and push the latter toward an open position thereby enabling the driver of a vehicle to move his vehicle through the fence without dismounting from the vehicle. Although the gate latching mechanism of the instant invention is adapted to be utilized on many types of gates including those horizontally swingable gates closing a passageway through a yard fence of the like, the gate latching mechanism of the instant invention, together with the aforementioned means for yieldingly urging the associated gate member to the closed position and controlling the rate of movement of the gate member toward the closed position, function particularly well to provide a horizontally swingable gate member for a roadway through a fence.

The main object of this invention is to provide a gate latching mechanism of an improved type for releasably securing a horizontally swingable gate member in a closed position and in such a manner that the gate member may be opened by a vehicle pushing on the free swinging end portion of the gate member from either side thereof.

Still another object of this invention is to provide the associated horizontally swingable gate member with means for yieldingly urging the gate member toward its closed position.

A still further object of this invention, in accordance with the preceding objects, is to provide means for controlling the rate of movement of the associated gate member toward the closed position thereby enabling a vehicle to be utilized to push the associated gate member toward an open position beyond that which is required to enable passage of the vehicle therethrough and allowing the means for controlling the rate of closing of the gate member to prevent the gate member from contacting the side of the vehicle as the vehicle passes through the gate opening.

A final object of this invention to be specifically enumerated herein is to provide a gate latching mechanism which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a horizontally swingable gate shown with the gate latching mechanism of the instant invention operatively associated therewith;

FIGURE 2 is a side elevational view of the assemblage illustrated in FIGURE 1;

FIGURE 3 is an enlarged fragmentary vertical sectional view taken substantially upon the plane indicated by section line 3—3 of FIGURE 2;

FIGURE 4 is a top plan view of the assemblage illustrated in FIGURE 3 with parts thereof being broken away and shown in horizontal section;

FIGURE 5 is an enlarged fragmentary vertical sectional view taken substantially upon the plane indicated by section line 5—5 of FIGURE 4;

FIGURE 6 is an enlarged fragmentary vertical sectional view taken substantially upon the plane indicated by section line 6—6 of FIGURE 1; and FIGURE 7 is a fragmentary enlarged horizontal sectional view taken substantially upon the plane indicated by the section line 7—7 of FIGURE 2 and with alternate positions of the gate member illustrated in phantom lines.

Referring now more specifically to the drawings the numeral 10 generally designates an upstanding fence assembly including first and second sections generally referred to by the reference numerals 12 and 14. The sections 12 and 14 are aligned and spaced apart with upstanding end posts 16 and 18 thereof defining the adjacent ends of the sections 12 and 14, respectively.

A horizontally swingable gate member is generally referred to by the reference numeral 20 and includes a pivoted end with means 22 and 24 defining vertically aligned journals which are rotatably received on upstanding pivot pins 26 and 28, respectively, carried by the end post 18. In this manner, the gate member is mounted for horizontal swinging movement about an upstanding axis defined by the pivot pins 26 and 28.

The gate member 20 includes an upper horizontal member 30 having one end portion 32 thereof which defines an extension projecting over the upper horizontal member 34 of the section 14. An elongated and transversely extending anchor 36 is secured to the horizontal member 34 and a pair of expansion springs 38 and 40 have one pair of corresponding ends secured to the remote ends of the anchor member 36 and the other pair of corresponding ends secured to an anchor 41 carried by that portion of the extension 32 which extends over the horizontal member 34. The opposite ends of the anchor member 36 are provided with sets of longitudinally spaced apertures 42 in which the corresponding ends of the expansion springs 38 and 40 may be selectively engaged and the anchor member 41 is also provided with a set of longitudinally spaced apertures 44 with which the corresponding ends of the expansion springs 38 and 40 may be selectively engaged.

Accordingly, it may be seen that the expansion springs 38 and 40 will yieldingly urge the gate member 20 toward the closed position illustrated in FIGURES 1 and 2 of the drawings. However, the horizontal member 34 includes an upstanding pivot pin 48 and a second pivot pin 50 is releasably carried by the gate member 20. The opposite ends of a conventional shock absorber 52 which is of the airplane and telescoping type are pivotally secured to the pivot pins 48 and 50. As can best be seen from FIGURE 7 of the drawings, the shock absorber 52 is telescoped toward a fully closed position when the gate member 20 is swung from the closed position illustrated in phantom lines toward the open position illustrated by the phantom lines 54. Inasmuch as conventional shock absorbers are relatively easily collapsed, the shock absorber 52 does not offer much resistance to swinging movement of the gate member 20 from the closed position toward the open position. On the other hand, as conventional shock absorbers do offer considerable resistance to their being extended, the gate member 20, urged by one of the expansion springs 38 and 40 toward the closed position, is operative to check the speed at which the gate member swings toward the closed position. Accordingly, a vehicle engaging the gate member 20 from either may be utilized to swing the gate member 20 toward a substantially full opened position and the shock absorber 52 will prevent the gate member 20 from swinging quickly back toward the closed position in a manner to engage the side of the vehicle which was utilized to open the gate member.

The reference numeral 60 generally refers to the gate latching mechanism of the instant invention. The mechanism 60 includes an anchor plate assembly generally referred to by the reference numeral 62 and which comprises a generally L-shaped bracket including an upstanding flange 64 and a lower laterally directed horizontal flange 66. The assembly 62 may be secured to the support or post 16 in any convenient manner so as to be orientated as illustrated in FIGURE 3 of the drawings and it may be seen that the upstanding flange 64 includes upwardly convergent opposite end upper edge portions 68 and 70 the lower ends of which edge portions are coplanar with the downturned opposite end portions 72 and 74, respectively of the horizontal flange 66.

The opposite end portions of the upstanding flange 64 are each provided with a horizontal bore 76 through which a pivot anchor 78 is secured. Each pivot anchor 78 has a bearing sleeve 80 telescoped thereover and a generally triangular keeper member 82 is pivotally supported from each sleeve 80. In addition, the upstanding flange 64 has a pair of angle anchors 84 secured thereto in any convenient manner such as by welding and the coiled portions 86 of a pair of torsion springs 88 are disposed about the corresponding sleeves 80 with one free end of each torsion spring engaged with the corresponding angle or anchor bracket 84 and the other free end portion 92 of each torsion spring 88 engaged with an anchor fastener 94 secured through the corresponding keeper member 82.

The gate member 20 includes an open-ended housing 96 on its free edge portion which extends generally longitudinally of the gate member 20 and is horizontally aligned with the bracket 62. An elongated and longitudinally extending latch pin 98 has one end portion pivotally secured within the housing 96 by means of pivot pin 100 secured between the opposite sides 102 of the housing 96. The other end of the latch pin 98 projects outwardly of the free end of the gate member 20 and is generally horizontally aligned with the bracket 62 for movement through a generally horizontally disposed plane upon swinging movement of the gate. The horizontal plane through which the latching pin 98 is swingable generally parallels the horizontal flange 66 and is spaced between horizontal planes containing the horizontal flange 66 and the lower ends of the angle brackets or anchors 84.

The latching pin 98 includes an upstanding anchor 106 which is opposed by a depending anchor 108 supported from the upper wall 110 of the housing 96 and a compression spring 112 has its opposite ends engaged with the anchors 106 and 108 and yieldingly urges the free swinging end portion of the anchor pin 98 downwardly toward a rest position engaged with the bottom wall 114 of the housing 96.

In operation, assuming the gate member 20 to be in the closed position and with attention invited to FIGURE 3 of the drawings, a vehicle may approach the gate member 20 from either side thereof and push the free swinging edge portion of the gate member 20 toward an open position. Initial movement of the gate member 20 toward the open position will of course cause the extended end portion of the latching pin 98 to engage the inner surface 116 of the corresponding triangular keeper member 82. Further movement of the latch pin 98 will of course cause the keeper member 82 to be pivoted successively to the positions illustrated by the phantom lines 118 and 120 in FIGURE 3 of the drawings. After the keeper member 82 has been pivoted to the position illustrated by the phantom lines 120, the latching pin 98 is then free to continue movement away from the position illustrated in solid lines in FIGURE 3 of the drawings as the gate member 20 is pivoted further toward the full open position.

The gate member 20 will of course gain momentum as it is being moved toward an open position and thus will continue to move toward the open position after the forward end of the vehicle being utilized to push the gate member 20 toward the open position passes the free end of the gate member 20. As soon as the expansion spring 38 checks the movement of the gate member 20 toward the open position and begins to return the gate member 20 toward the closed position illustrated in FIGURE 2 of the drawings, the shock absorber 52 will check the rate of speed of the gate member 20 toward the closed position thus affording sufficient time for the vehicle which pushed the gate member 20 to the open position to pass through the fence 10 before being contacted by the free swinging edge portion of the gate member 20. Of course, the expansion spring 38 will ultimately return the gate member 20 back to the position wherein the free extended end portion of the latching pin 98 will engage the inclined camming surface 124 of the keeper member 82. Continued movement of the gate member 20 toward the closed position will cause the free end portion of the latching pin 98 to be cammed upwardly by the camming surface 124 in a manner such that the pivot pin 98 rides up and over the keeper member 82 to the pivoted end thereof. Then, as the gate member 20 moves into the final fully closed position, the free end of the latching pin 98 will ride off the pivoted end of the keeper member 82 enabling the compression spring 112 to urge the free end of the latching pin 98 downwardly between the angle brackets or anchors 84. Engagement of the free end of the anchor pin 98 by the anchor 84 will stop the swinging movement of the gate member 20 and the expansion springs 38 and 40 will ultimately center the free end of the anchor pin 98 between the adjacent ends of the downwardly convergent generally horizontal flange portions 130 of the anchors 84 in order that the free end of the pin 98 may again drop down to its horizontal rest position disposed between the inner surfaces 116 of the keeper members 82.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gate assembly comprising support means and a gate member swingable relative to said support means, coacting means carried by said gate member and said support means operative to positively stop swinging movement of said gate member as it is swung in one direction to a predetermined position and to subsequently yieldingly retain said gate member in said predetermined pivoted position against swinging movement in the other direction therefrom and permitting the gate member to swing from said predetermined position in said other direction independent of said gate member being bowed.

2. A gate assembly comprising an upstanding gate member and upstanding support means, means pivotally securing one upstanding edge portion of said gate member to said support means for rotation about an upstanding axis, means operatively connected between said gate member and said support means yieldingly urging said gate member toward a predetermined pivoted position relative to said support means, coacting means carried by said gate member and said support means operative to initially positively stop swinging movement of said gate member as it is swung in one direction to said predetermined position and to subsequently automatically yieldingly retain said gate member against subsequent swinging movement in the other direction away from said predetermined position after swinging movement of said gate member to said predetermined position is terminated and permitting the gate member to swing from said predetermined position in said other direction independent of said gate member being bowed.

3. The combination of claim 2 including means operatively connected between said support means and said gate member controlling the rate of free swinging movement of said gate member toward said predetermined position.

4. The combination of claim 1 including means operatively connected between said support means and said gate member controlling the rate of free swinging movement of said gate member toward said predetermined position.

5. A gate assembly comprising an upstanding gate member and upstanding support means, means pivotally securing one upstanding edge portion of said gate member to said support means for rotation about an upstanding axis, coacting means carried by said gate member and said support means operative to yieldingly retain said gate member in said predetermined pivoted position as it swings to the latter, said coacting means including an elongated latching pin projecting outwardly from the free end of said gate member and including an outer end vertically shiftable above and yieldingly urged downwardly toward a lower limit position in which said outer end is swingable through a generally horizontal plane, at least one horizontally elongated wedge-shaped keeper member including an upright abutment surface on its major end disposed above said plane and a downwardly inclined surface on its minor end extending through said plane, means pivotally supporting said major end of said keeper member from said support means for movement of said keeper member between a generally horizontally disposed rest position and a raised position with said minor end inclined upwardly and said major end swung to a position above said plane about a generally horizontal axis, said keeper member being disposed, when in said rest position, with said minor end projecting toward said free end of said gate member as the latter approaches said predetermined position.

6. The combination of claim 5 including abutment means supported from said support means and disposed behind the major end of said keeper member in the direction of swinging movement of said gate member to said predetermined position engageable by said latching pin to prevent swinging movement of said gate member past said predetermined position.

7. The combination of claim 1 wherein said coacting means includes means operative to positively stop movement of said gate member in either direction as it moves to said predetermined position and to subsequently yieldingly retain said gate member in said predetermined position against subsequent movement in either direction away from said predetermined position.

8. A latching mechanism for a linearly movable member, said latching mechanism including an elongated cam and stop member including front and rear ends swingably supported at its rear end for oscillation about a fixed axis between first and second positions, said cam and stop member including a forwardly facing elongated longitudinally extending cam surface acutely inclined relative to a plane generally paralleling said axis and through which said cam surface extends and a rearwardly facing abutment surface passing through and inclined more than 45 degrees relative to said plane when said cam and stop member is in said first position, said axis being disposed on the side of said plane on which the rearmost portion of said forwardly facing cam surface is disposed, said cam and stop member being yieldingly urged toward said first position, free of portions thereof disposed on the other side of said plane when in said second position and swingable to said second position upon forward advancement of an abutment member abutted with said rearwardly facing surface along said plane so as to free said abutment member from behind said cam and stop member.

9. The combination of claim 8 including a forwardly facing abutment surface stationarily positioned relative to said axis rearward of said rear face and above said plane and adapted to be engaged by said abutment member upon its rearward advancement along said forwardly facing cam surface and movement off the rear end of said cam and stop member, said forwardly facing abutment surface terminating in a direction toward said plane in a forwardly directed surface terminating rearwardly of said rear face and inclined slightly toward said plane.

10. The combination of claim 9 wherein said latching mechanism includes a pair of oppositely facing cam and stop members spaced along said plane.

11. The combination of claim 8 including a forwardly facing abutment surface stationarily positioned relative to said axis rearward of said rear face and above said plane and adapted to be engaged by said abutment member upon its rearward advancement along said forwardly facing cam surface and movement off the rear end of said cam and stop member, said forwardly facing abutment surface terminating in a direction toward said plane in a forwardly directed surface terminating rearwardly of said rear face and inclined slightly toward said plane, said latching mechanism including a pair of oppositely facing cam and stop members spaced along said plane, and a pair of abutment surfaces which oppose each other and are disposed between the rear ends of said cam and stop member.

References Cited

UNITED STATES PATENTS

| 1,272,468 | 7/1918 | Lewis | 49—386 X |
| 2,505,467 | 4/1950 | Eilert | 49—386 X |
| 2,578,848 | 12/1951 | Shirley | 292—341.17 |
| 2,691,836 | 10/1954 | David | 49—364 X |
| 2,693,043 | 11/1954 | Leake | 292—341.17 X |
| 2,818,294 | 12/1957 | Killough | 49—394 X |
| 3,170,258 | 2/1965 | Ohlhausen | 49—386 X |

DAVID J. WILLIAMOWSKY, *Primary Examiner.*

HARRISON R. MOSELEY, *Examiner.*

DONALD L. TAYLOR, *Assistant Examiner.*